March 26, 1968 K. H. PUECHL 3,375,371
METHOD OF AND APPARATUS FOR DETERMINATION OF NUCLEAR POISON
Filed May 18, 1964
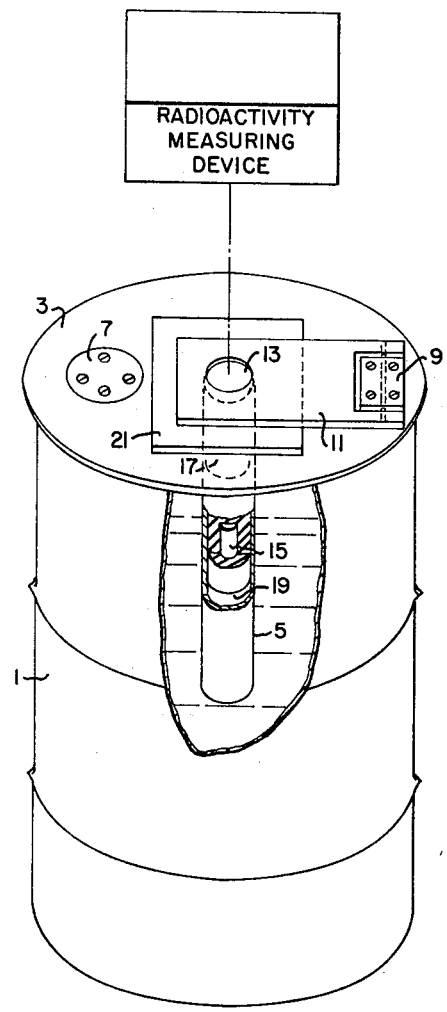

United States Patent Office 3,375,371
Patented Mar. 26, 1968

3,375,371
METHOD OF AND APPARATUS FOR DETERMINATION OF NUCLEAR POISON
Karl H. Puechl, Pitcairn, Pa., assignor to Nuclear Materials and Equipment Corporation, Apollo, Pa., a corporation of Pennsylvania
Filed May 18, 1964, Ser. No. 368,315
4 Claims. (Cl. 250—83.3)

This invention relates to the nuclear art and has particular relationship to the determination of the quantity of nuclear poison in materials, particularly such materials as are used to control, and to provide shielding for, nuclear reactors. Typical of such materials are boron, stainless steel including boron, cadmium alloys, hafnium and its alloys.

In accordance with the teachings of the prior art the poison content of poison-containing material is determined by wet chemical analysis of samples of the material. This requires that samples of the material be destroyed. Attempts have been made to determine poison content non-destructively. Where nuclear poison content is low the determination was attempted by measuring the neutron transmission or neutron degradation as neutrons from a source pass through the material. But this has proved ineffective for materials containing large quantities of nuclear poison.

It is an object of this invention to determine nondestructively the nuclear-poison content of material.

Another object of this invention is to provide a method and apparatus for accomplishing this purpose.

This invention is based on the phenomenon that certain materials when impinged by neutrons become radioactive by reason of neutron capture and/or neutron absorption. The invention arises from the realization that the neutron absorption properties of the specimen may be coordinated with the related properties of the material so that the poison content may be measured accurately. For example, a specimen may completely absorb thermal neutrons and completely pass high-energy neutrons but it may partly pass and partly absorb epithermal neutrons. The poison content of such a specimen can be determined by measuring the epithermal neutron flux passed with a detector material activated by epithermal neutrons.

In accordance with this invention the quantity of nuclear poison is determined by projecting neutrons on the specimen under measurement and by causing the resulting neutrons emitted by the specimen to impinge on a detector material that is, a material which becomes radioactive when neutrons impinge thereon by means of the neutron capture and/or absorption by and activation of, the material. Specifically the neutrons may be projected on a surface of the specimen and the neutrons transmitted through the specimen may impinge on the material which becomes radioactive. A detector material, or a material which becomes radioactive, may be defined as any material which emits alpha, and/or beta and/or gamma rays when the neutrons impinge thereon whether the rays are emitted only during the irradiation by the neutrons, or for very short times thereafter ($10^{-8}$ seconds), or the irradiated materials have half-lives of substantial duration. For neutrons of the proper energy content the number of resulting neutrons emitted or transmitted by the specimen is inversely proportional to the quantity of poison in the specimen and the radioactivity is in turn proportional to the number of neutrons impinging on the material. The quantity of nuclear poison may be determined by measuring the radioactivity either after the material is irradiated or in situ.

The neutrons may be derived from a suitable source. Typical of such sources are beryllium-polonium, beryllium-radium, beryllium-plutonium, beryllium-americium.

The effectiveness of this invention in determining poison content arises from the property of the detector material in responding selectively not only to thermal neutrons but also to epithermal and/or high energy neutrons. Some detector materials have neutron resonance-absorption or neutron-threshold absorption properties. The detector material used may be tailored to the absorption properties of the poison under measurement so that the maximum sensitivity is achieved.

In the following Tables I, II and III, detector materials and their important properties are presented.

TABLE I.—DETECTOR MATERIALS FOR HIGH ENERGY NEUTRONS

| Reaction: | | Half-life |
|---|---|---|
| $Cl^{35}(n, P)S^{35}$ | days | 87 |
| $Cl^{35}(n, \alpha)P^{32}$ | do | 14.3 |
| $Co^{59}(n, \alpha)Mn^{56}$ | hours | 2.58 |
| $Cs^{133}(n, \alpha)I^{130}$ | do | 12.6 |
| $Cu^{63}(n, \alpha)Co^{60}$ | years | 5.4 |
| $Fe^{54}(n, P)Mn^{54}$ | days | 291 |
| $Mo^{92}(n, P)Nb^{92}$ | do | 10 |
| $Mo^{92}(n, \alpha)Zr^{89}$ | hours | 79 |
| $Nb^{93}(n, \alpha)Y^{90}$ | do | 64 |
| $Ni^{58}(n, P)Co^{58}$ | days | 72 |
| $Ni^{58}(n, \alpha)Fe^{55}$ | years | 2.9 |
| $Ti^{47}(n, P)Sc^{47}$ | days | 3.4 |
| $Tl^{203}(n, P)Hg^{203}$ | do | 48 |
| $Zn^{64}(n, P)Cu^{64}$ | hours | 12.8 |
| $Zn^{67}(n, P)Cu^{67}$ | do | 60 |
| $Zn^{68}(n, \alpha)Ni^{65}$ | do | 2.6 |

TABLE II.—DETECTOR MATERIALS FOR EPITHERMAL NEUTRONS (INSTANTANEOUS OR PROMPT EMISSION OF GAMMA RAYS)

| Element | Mass Number | | $\sigma(n, \gamma)$ Barns | Closest Resonance energy-electron volts |
|---|---|---|---|---|
| $_{27}Co$ | 59 | | 35 | 120 |
| | | 10.7 min. | .66 | |
| | | 5.3 year | 22 | |
| $_{25}Mn$ | 55 | | 12.6 | 345 |
| $_{47}Ag$ | 107 | | 30 | 45 |
| | 109 | | 84 | 5.1 |
| | | 22 sec. | 100 | |
| | | 225 days | 2.3 | |
| $_{48}Cd$ | 106 | | 1 | |
| | 110 | | .2 | |
| | 113 | | 19,500 | .18 |
| | 114 | (2.3 day) | 1.1 | |
| | | 43 days | .14 | |
| | 116 | | 1.4 | |
| $_{49}In$ | 113 | (72 sec.) | 2 | 3.8 |
| | | 50 days | 56 | |
| | 115 | 13 sec. | 52 | 1.44 |
| | | 54 min. | 145 | |
| $_{66}Dy$ | 164 | (1.3 min.) | 3,000 | 1.74 |
| | | 2.4 hrs. | 2,600 | |
| $_{72}Hf$ | 177 | | 500 | 1.0 |
| | 180 | | 10 | |
| $_{79}Au$ | 197 | | 95 | 4.8 |

TABLE III.—DETECTOR MATERIALS FOR EPITHERMAL NEUTRONS (DECAYING RADIOACTIVITY)

| Element or Isotope | Abundance in Material, Percent | Activation Cross Section Barns | Half-Life of Activity | Important Resonance Energy, Electron volts |
|---|---|---|---|---|
| $Mn^{55}$ | 100 | 13.4 | 2.6 hr. | 337. |
| $Rh^{103}$ | 100 | 12 | 4.4 min. | 1.26 |
| | | 140 | 42 sec. | |
| $Ag^{107}$ | 51.4 | 45 | 2.3 min. | 5.2 |
| $Ag^{109}$ | 48.6 | 3.2 | 270 days | |
| | | 113 | 24.2 sec. | |
| $In^{113}$ | 4.2 | 56 | 49 days | 1.46 |
| | | 2.0 | 72 sec. | 3.9 |
| $In^{115}$ | 95.8 | 155 | 54 min. | 9.1 |
| | | 52 | 13 sec. | |
| $Dy^{164}$ | 28.2 | 510 | 1.3 min. | 1.70 |
| | | 2,100 | 2.3 hrs. | 5.40 |
| $Dy^{165}$ | (¹) | 5,000 | 82 hrs. | |
| $Au^{197}$ | 100 | 96 | 2.7 days | 4.9 |
| $Au^{198}$ | (²) | 26,000 | 3.2 days | |

¹ 2.4 hr. half-life.
² 2.7 day half-life.

In Table I the starting material is given in the left; the first letter in the parentheses is the absorbed particle, the second letter the emitted particle; the resulting material is indicated on the right. Thus the reaction described in the first row is bombardment of chlorine 35 by a high-energy neutron to produce sulfur 35. Sulfur 35 is radio-active having a half-life of 87 days. The detector materials of Table I may be used to determine quantities of poisons which moderately absorb high-speed neutrons.

Tables II and III may be used for epithermal neutrons. In Table II $\sigma$ $(n, \gamma)$ is the cross section of the material for neutrons which result in the emission of gamma rays.

In the typical practice of this invention a detector material is selected which has a resonance-absorption peak or a threshold at the neutron-energy peak at which, or within the range of neutron energies over which, the poison under measurement partly absorbs but to a large extent transmits neutrons. Material to which this invention has been successfully applied is steel containing relatively large quantities of boron and boron carbide. The non-destructive determination of the quantity of boron in such steel, in accordance with the teachings of the prior art, was not practicable because such material does not transmit thermal neutrons in adequate quantities for accurate measurement. Typically where the boron content is low, the determination has an accuracy within about plus or minus 10%. Nor does this material appreciably absorb high energy neutrons. But this boron-containing material does transmit epithermal neutrons which activate indium.

In the practice of this invention the boron-containing steel is interposed between a neutron source and an indium foil which had been pre-calibrated to determine its response to known boron contents. The boron content is determined by irradiating the foil for a predetermined time interval and then determining its radioactivity. In this way boron content has been determined to within plus or minus 1%.

In the practice of this invention a detector material is selected in accordance with the neutron absorbing properties of the nuclear poison in the material under test. This detector material in foil or other form is then calibrated. For this purpose, a mass of predetermined weight of the detector material is subjected to neutrons emitted by a plurality of specimens of the type of material under test which have been chemically analyzed for poison content and a calibration curve is plotted. For convenience the detector material may be irradiated for different time intervals and a family of calibration curves for the different intervals may be provided. For example, if the material under test is boron-containing stainless steel, the calibration specimens may be a like material which is available for destructive chemical analysis. The detector mass is subjected to the emitted neutrons in the same way as the determinations are to be carried out. If the detector material is irradiated with neutrons transmitted through the specimen, the detector material should be impinged by neutrons transmitted through the calibration specimen; if the determination is by neutrons scattered laterally by the specimens the calibrations should be carried out in the same way. The detector material should be irradiated during calibration for a predetermined time interval. The radioactivity should then be measured in situ or a predetermined time interval after irradiation. For example, indium has a half-life of fifty-four minutes and its radioactivity may be measured at any reasonable time after irradiation. With the radioactivity for the known poison content determined, non-destructive determination can be made for other contents. If the calibrated detector material after it losses its radioactivity is subject to neutrons emitted by the unkown specimen on being irradiated by the source used in the calibration, for the time interval used during calibrating and its radioactivity is measured the same time interval as used during the calibration, after it is subjected, the poison content in the unknown specimen may be derived from the calibration curve. Within limits calibration of any specimen of detector material applies to like detector material, and once a specimen of detector material is calibrated, the calibration may be applied to like detector material, but a correction must be made for the weight of the detector material. Within limits the calibrated response of any detector material is proportional to its weight. Thus the response of 1.1 grams of indium foil is 10% greater than the response of 1 gram.

Calibrated detector materials having relatively short half-lives may be used repeatedly after the radio-activity has decayed to a low magnitude. For example, indium can be used at intervals of about two or three days.

Certain novel features considered characteristic of this invention are disclosed above. For a clearer understanding of this invention, both as to its organization and as to its method of operation, together with additional objects and advantages thereof, reference is made to the following description, taken in connection with the accompanying drawing, in which, the single figure is a view in perspective showing apparatus in accordance with this invention.

The apparatus shown in the drawing includes a drum 1 to which a top or lid 3 is tightly secured. A tube 5 is centrally secured to the lid 3 and extends into the drum 1. The drum is provided with a bung 7 displaced from the tube 5. The bung 7 may be removed and a neutron absorbing and reflecting material such as water, paraffin, or polyethylene may be disposed into the drum. This material should completely enclose the tube 5.

A hinge 9 is secured near the periphery of the lid 3. A plate 11 is pivotally secured to the hinge 9. The plate 11 extends radially across the lid 3 to a position beyond the upper rim of the tube 5. The plate 11 has an opening 13 coaxial with the tube 5.

In the use of this apparatus a neutron source 15 is inserted between polyethylene spacers 17 and 19 in tube 5. The spacers 17 and 19 may be dimensioned so that the source 15 emits predetermined neutron flux. The plate 11 is then raised and the specimen 21 placed over the rim of tube 5. The plate 11 is then disposed on the specimen 21 and a calibrated detector material, for example, calibrated indium foil is inserted in the opening 13. The foil is irradiated for a predetermined interval and its radioactivity is measured to determine the poison content of the specimen. Where the radioactive emission is instantaneous it may be measured in situ by measuring device 23.

To facilitate understanding of the invention the following summary is presented:

Nuclear poisons, that is, materials having high neutron cross sections, are used to control nuclear reactors and to provide shielding for such reactors. In both these applications, boron carbide, stainless steel containing boron, cadmium alloys, hafnium, etc., are utilized. Up until now it has been customary to analyze for the nuclear poison content of metallic pieces by destructively taking samples and performing wet chemical analyses. In addition, where the nuclear poison content is low, a neutron source has been utilized, and with a neutron detector the amount of poison content has been determined by noting the neutron transmission or, more precisely, the neutron degradation as the neutrons pass through the material. For materials containing large amounts of nuclear poison as are required for most of the applications, the only satisfactory technique for analysis has been by destructive sampling.

This invention affords a ready means for determining the nuclear content by nondestructive testing over the entire range of compositions from no poison to all poison.

The method utilizes a neutron source and is basically a neutron transmission or scattering measurement except that an appropriate detector material is placed on the opposite face from the neutron source or in such a way as to receive the scattered neutrons, and these detector materials are subsequently counted in situ or in a separate counting device to determine the beta or gamma rays that are emitted by reason of neutron capture and/or absorption and activation. By this technique, appropriate foils can be used to detect neutrons having such energies as to give maximum sensitivity to the measurements. This flexibility is not available under the straight transmission and neutron detection methods utilized at present. For example, for steel plates containing large amounts of boron, the transmission of thermal neutrons is essentially zero, and straight neutron detection therefore gives no results. By using an indium foil as a detector, however, the foil "sees" and is activated by only epithermal neutrons; and these are readily transmitted even with high boron content, and the magnitude of such transmission is inversely proportional to the boron content. With the use of an indium foil, transmission is determined by subsequent measurement of the beta or gamma rays that are emitted by indium. This technique has been shown in the practice of this invention to be successful over the full range of boron compositions for samples having foil thicknesses to a few inches.

Other resonance absorbers that are activated and subsequently emit beta or gamma rays can be used in place of the indium, and some are more sensitive than others, depending upon the neutron poison that is in the material of interest. Also, in some instances foils can be used whose neutron absorption characteristics are similar to other resonance absorbers but whose product subsequent to neutron absorption is stable. In this manner, the capture gamma rays, that is, gamma rays emitted essentially instantaneously upon neutron absorption can be measured while the foil is in situ. Depending upon the accuracy of the measurements desired and possible interferences from the product material, an ordinary Geiger tube can be used for detection, or a single channel analysis can be used to discriminate and measure only the gamma rays of energy characteristic of the foil material.

While a preferred embodiment of this invention has been disclosed herein many modifications thereof are feasible. This invention then is not to be restricted except insofar as is necessitated by the spirit of the prior art.

I claim as my invention:

1. The method of non-destructive determination of the quantity of nuclear poison in a specimen, the poison in said specimen reacting with neutron fluxes in accordance with their energies, absorbing substantially completely neutron fluxes within a first energy range, passing substantially freely neutron fluxes within a second energy range, and partly abosrbing neutron fluxes in a third energy range, the said method comprising the steps of disposing said specimen between a source of neutrons including flux of said third energy range and a detector material which becomes radioactive when activated by neutrons and measuring the magnitude of radioactivity induced in said material by the resulting neutron flux in said third energy range emitted by said specimen.

2. The method of determination of the boron-10 content in a specimen of stainless steel having a substantial content of boron-10 said boron-10 partly absorbing neutrons in the epithermal energy range, the said method comprising the steps of causing neutrons having energies in the epithermal energy range to impinge on said specimen, causing the resulting neutrons emitted by said specimen also in the epithermal energy range, to impinge on a material which becomes radioactive when activated by neutrons in said epithermal energy range and measuring the magnitude of the so induced radioactivity of said material.

3. The method of claim 1 wherein the detector material has resonance absorption for the resulting neutron flux emitted by the specimen.

4. The method of claim 1 wherein the material has a threshold response to the resulting neutron flux emitted by the specimen.

References Cited

UNITED STATES PATENTS

| | | | |
|---|---|---|---|
| 2,206,634 | 7/1940 | Fermi et al. | 250—83.1 |
| 2,476,810 | 7/1949 | Brunner et al. | 250—43.5 |
| 2,491,320 | 12/1949 | Koontz | 250—83.1 X |
| 2,920,204 | 1/1960 | Youmans | 250—83.1 |

RALPH G. NILSON, *Primary Examiner.*

S. ELBAUM, *Assistant Examiner.*